United States Patent [19]

Lee

[11] Patent Number: 5,734,101
[45] Date of Patent: Mar. 31, 1998

[54] DEVICE FOR DETECTING LEAN BURN DRIVE MODE FOR A VEHICLE

[75] Inventor: Jong-Choon Lee, Kyoungki-do, Rep. of Korea

[73] Assignee: Kia Motors Corporation, Seoul, Rep. of Korea

[21] Appl. No.: 663,956

[22] Filed: Jun. 14, 1996

[30] Foreign Application Priority Data

May 31, 1996 [KR] Rep. of Korea ............. 1996-14109 U

[51] Int. Cl.[6] .................................................. G01M 15/00
[52] U.S. Cl. ................. 73/118.2; 73/118.1; 364/431.01; 340/439
[58] Field of Search ........................... 73/115, 116, 117.2, 73/117.3, 118.1; 364/431.01; 340/439

[56] References Cited

U.S. PATENT DOCUMENTS

| | | | |
|---|---|---|---|
| 3,789,816 | 2/1974 | Taplin et al. | 73/116 |
| 4,104,990 | 8/1978 | Frobenius | 73/117.3 |
| 5,452,603 | 9/1995 | Asano et al. | 73/116 |

*Primary Examiner*—George M. Dombroske

[57] ABSTRACT

The present invention relates to a device for detecting lean burn drive mode for a vehicle. In accordance with the present invention, when the lean burn engine is driven in the lean burn drive mode, the device lights the indicator lamp located at the front of the driving wheel. Accordingly, the driver is informed of whether the engine is operating in lean burn drive mode or not.

1 Claim, 1 Drawing Sheet

DEVICE FOR DETECTING LEAN BURN DRIVE MODE FOR A VEHICLE

FIELD OF THE INVENTION

The present invention relates to a device for detecting lean burn drive mode for a vehicle.

BACKGROUND OF THE INVENTION

A lean burn vehicle is provided with an engine that is capable of being driven in a lean burn condition which differs from a general burning condition found in a conventional vehicle. Naturally in a lean burn vehicle the driver wants to know whether the vehicle is operating in the general burning mode or in the lean burn drive mode in order to reduce fuel consumption. There is, however, no device for detecting the lean burn drive mode in the conventional lean burn vehicle, and thus the driver cannot know whether the vehicle is operating in the general burning mode or in the lean burn drive mode.

SUMMARY OF THE INVENTION

The purpose of the present invention is to provide a device for detecting a lean burn drive mode with an indicator lamp. The indicator lamp is located at the front of the driving handle. It detects a lean burn drive mode for the vehicle and informs the driver whether the vehicle is operating in lean burn drive mode.

In accordance with the present invention, the device for detecting lean burn drive mode for a vehicle having a lean burn engine comprises: a solenoid valve connected to the lean burn engine through a first vacuum tube; an actuator of a swirl control valve connected with the solenoid valve through a second vacuum tube; a ECU connected with the solenoid valve for controlling the lean burn engine; and an indicator lamp connected between the ECU and the solenoid valve. In addition, the indicator lamp is located at the front of the driving wheel for easy visibility. The ECU supplies an electric power to the solenoid valve when the engine is operating in the lean burn drive mode and so the indicator lamp is lighted to indicate the lean burn drive mode for vehicle. When the engine is operating in the general burning mode, the ECU does not supply electric power to the solenoid valve and the indicator lamp is not lighted.

DESCRIPTION OF THE DRAWINGS

The present invention can be understood from the following description of the embodiment with reference to the attached drawing in which.

DETAILED DESCRIPTION

Figure 1:
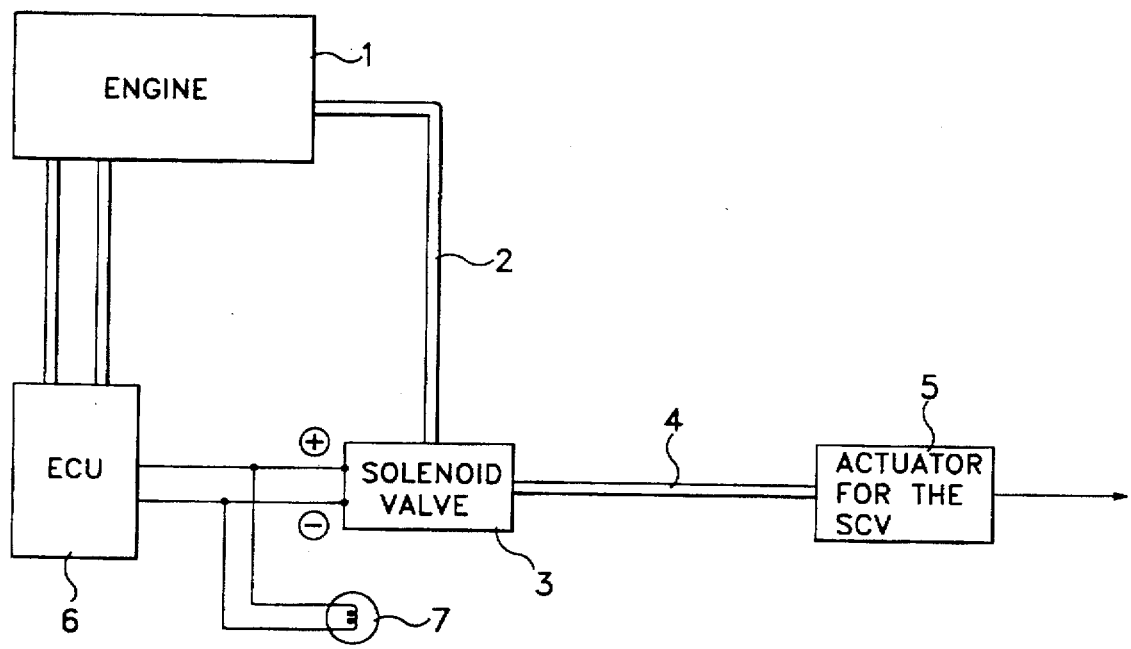
FIG. 1 shows the construction of the detecting device for a lean burn drive mode for vehicle in accordance with one embodiment of the present invention.

In FIG. 1, the construction of the detecting device for lean burn drive mode of vehicle according to one embodiment of the present invention is shown. An engine 1 is connected to a solenoid valve 3 through a first vacuum tube 2. In turn, the solenoid valve 3 is connected to an actuator 5 of a swirl control valve (not shown) through a second vacuum tube 4.

In addition, the solenoid valve 3 is connected to a ECU 6 controlling the lean burn engine 1. An indicator lamp 7 is connected between the ECU 6 and the solenoid valve 3. The indicator lamp 7 is located at the front of the steering wheel for easy visibility.

The ECU 6 supplies an electric power of DC 12 V to the solenoid valve 3 when the lean burn engine 1 is operating in the lean burn drive mode and to the indicator lamp 7 which lights to indicate the lean burn drive mode for the vehicle is in operation. Conversely, when the lean burn engine is operating in the general burning mode of theoretical air-fuel ratio, the ECU does not supply electric power to the solenoid valve and the indicator lamp 7 which accordingly does not light.

In accordance with the present invention, the device for detecting the lean burn drive mode for vehicle lights the indicator lamp 7 located at the front of the driving wheel only when the lean burn engine is driven in the lean burn drive mode.

According to the device for detecting the lean burn drive mode for the vehicle, the driver is informed of whether the vehicle is operating efficiently in the lean burn drive mode or not.

What is claimed is:

1. A device for detecting lean burn drive mode for a vehicle having an engine capable of operating in lean burn mode comprising:

a first vacuum tube;

a solenoid valve connected with the engine through the first vacuum tube;

a second vacuum tube;

an actuator of a swirl control valve, said solenoid valve connected to the actuator through the second vacuum tube;

an ECU connected to the solenoid valve; and an indicator lamp connected between the ECU and the solenoid valve and associated with a steering wheel, wherein the ECU supplies electric power to the solenoid valve when the engine is operating in the lean burn drive mode thereby lighting the indicator lamp to indicate the lean burn drive mode for the vehicle;

and wherein the ECU supplies electric power to the solenoid valve which in turn actuates the actuator of the swirl control valve.

* * * * *